United States Patent Office 3,339,364
Patented Sept. 5, 1967

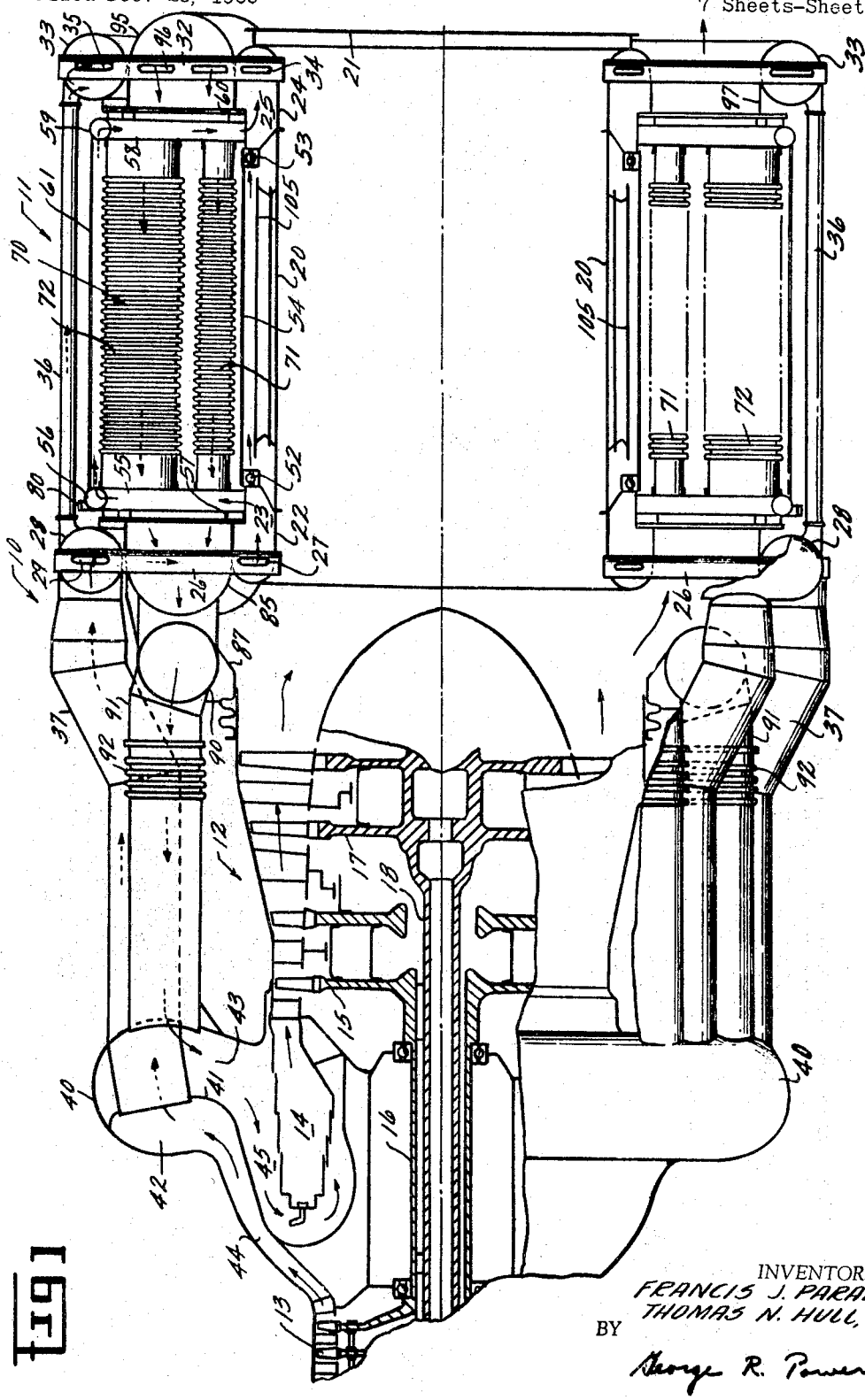

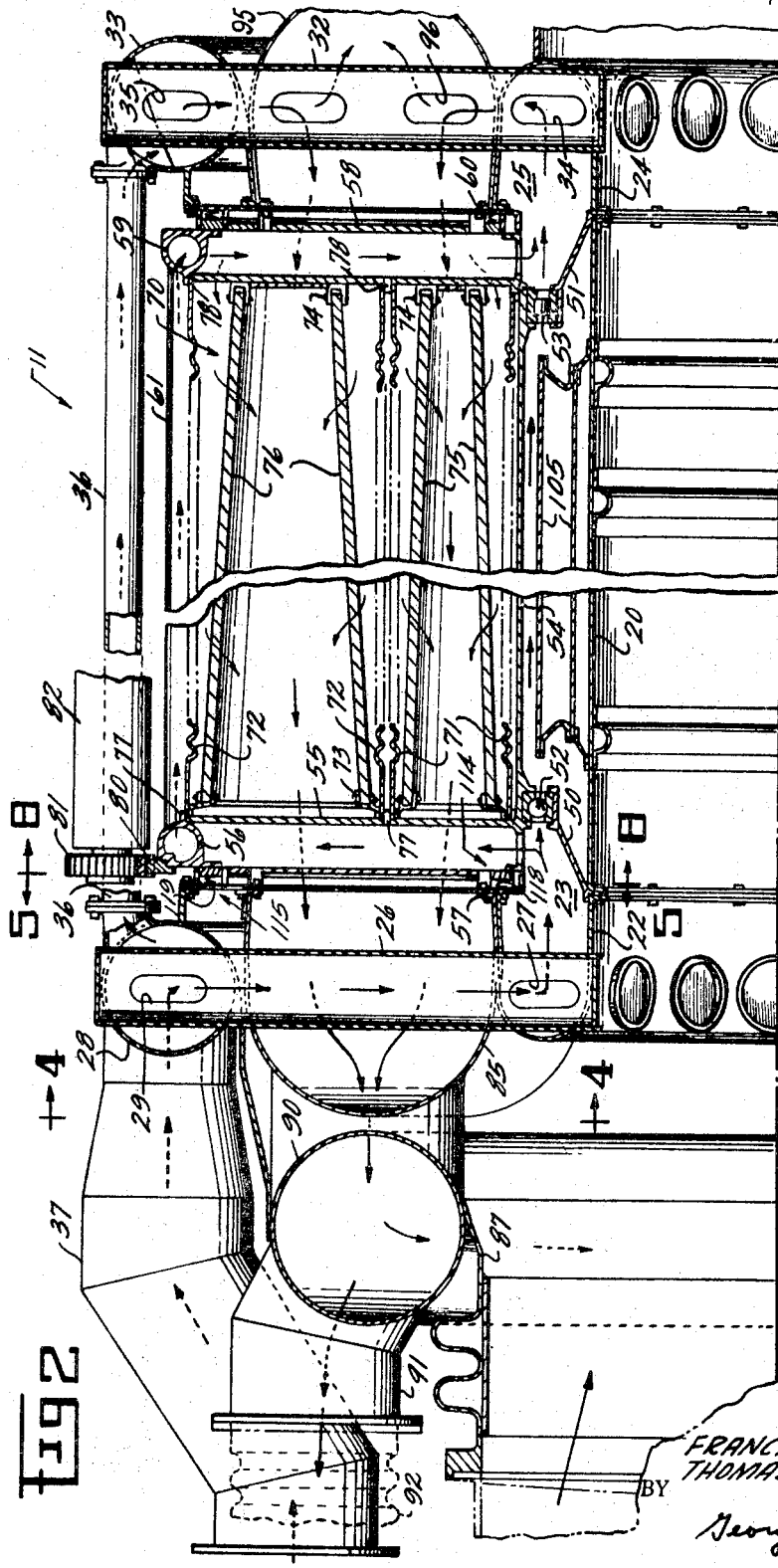

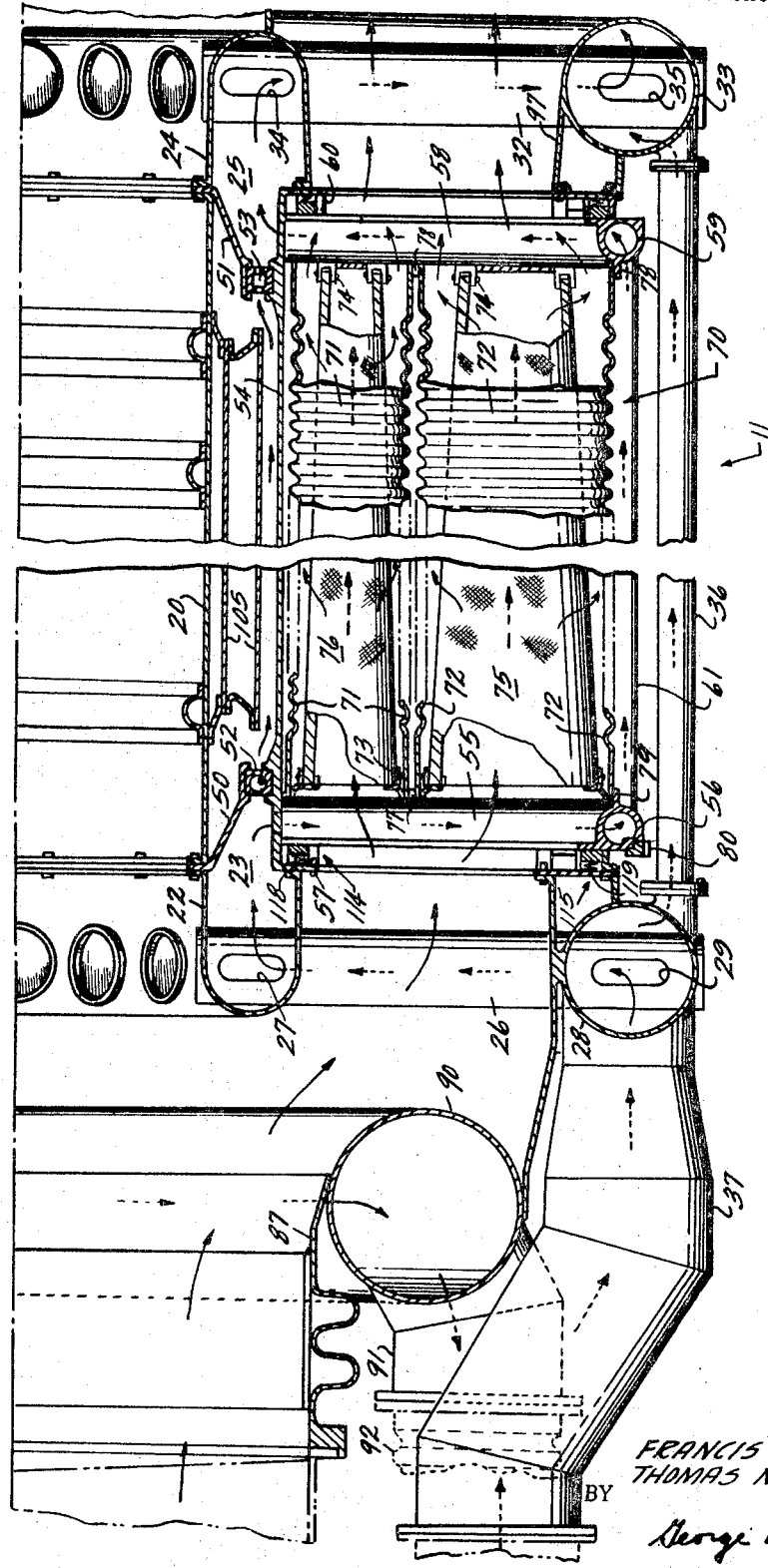

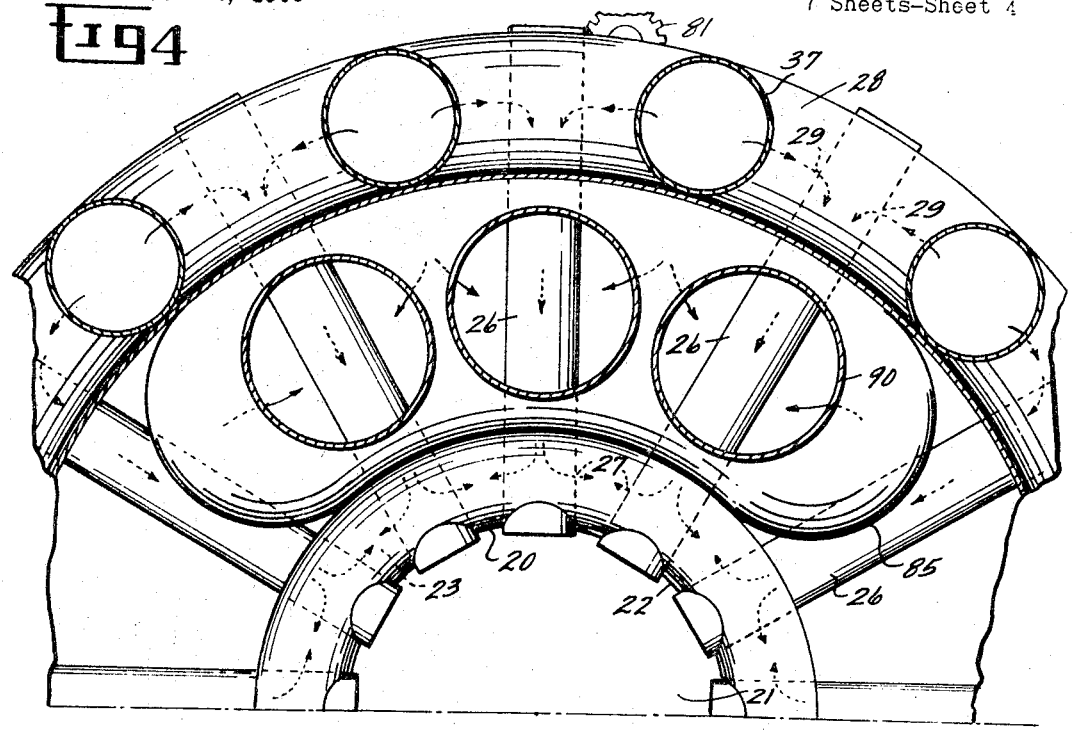
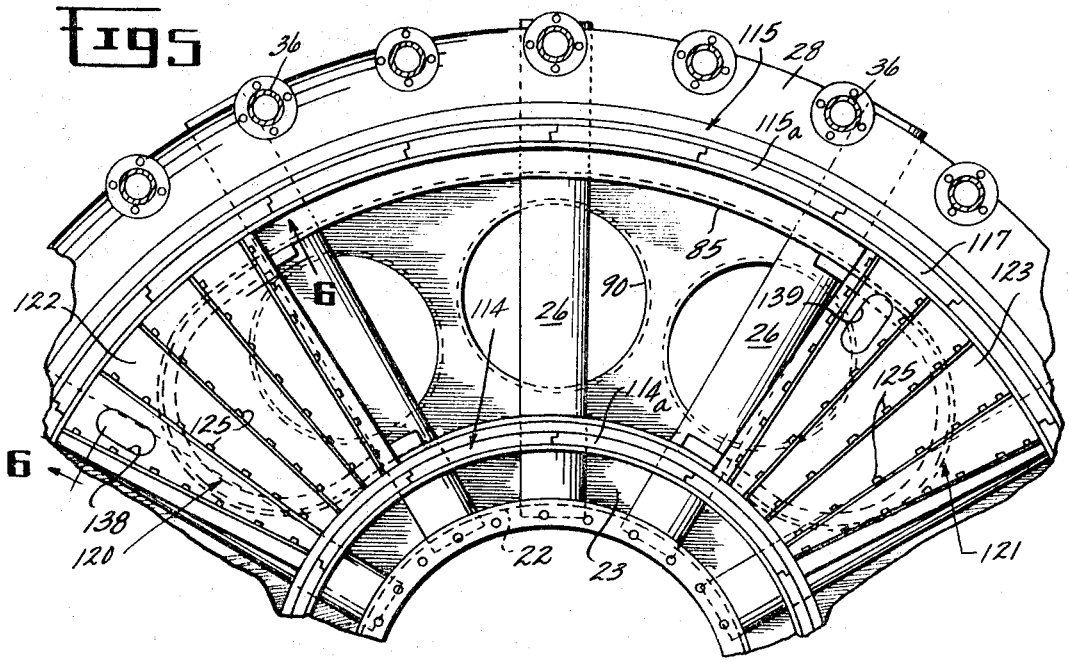

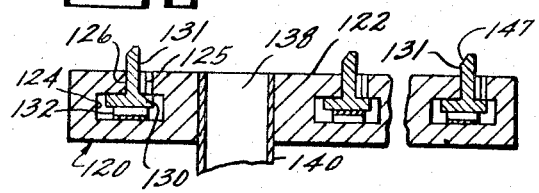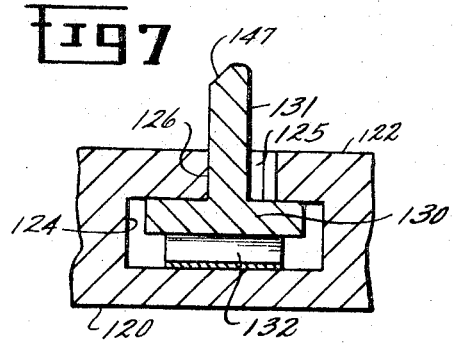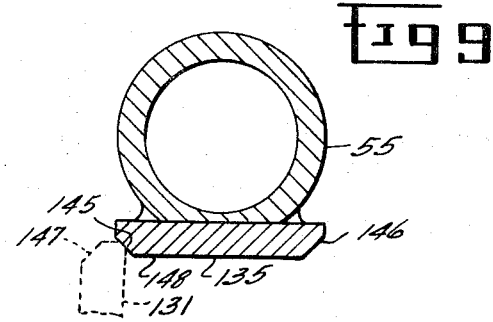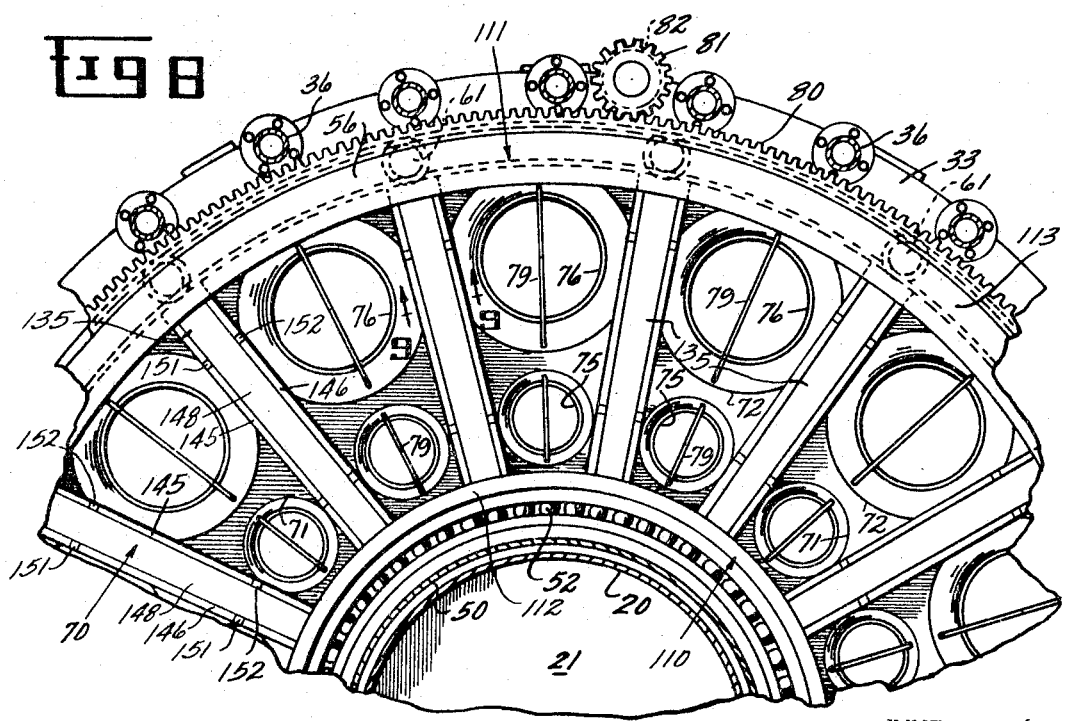

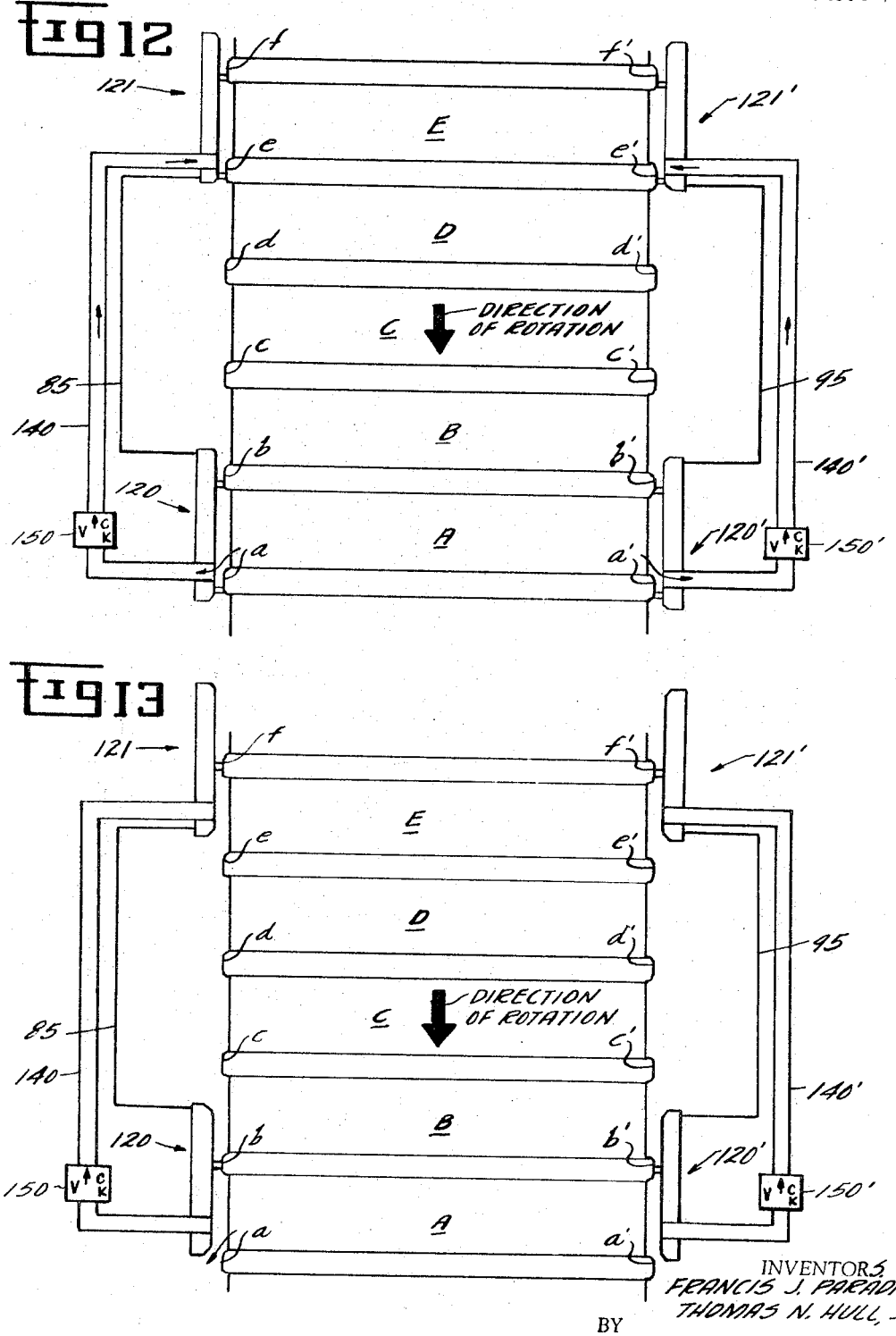

3,339,364
MEANS FOR REDUCING LEAKAGE IN ROTARY REGENERATORS
Francis Joseph Paradise and Thomas Neil Hull, Jr., Marblehead, Mass., assignors to General Electric Company, a corporation of New York
Filed Dec. 29, 1965, Ser. No. 517,414
11 Claims. (Cl. 60—39.51)

This invention relates to rotary regenerators for gas turbine powerplants and, more particularly, to improved means for reducing leakage in rotary regenerators.

It has been proposed in the past that gas turbine powerplants be provided with regenerators or recuperators for the purpose of reducing fuel consumption. More particularly, regenerators and recuperators are used to recover thermal energy by using the hot exhaust gases to preheat the air supplied to the combustor. From a thermodynamic viewpoint, a regenerative cycle in which the hot exhaust gases and the relatively cool compressor discharge air are alternately directed in opposite directions through a heat exchange matrix is an extremely effective means for lowering the specific fuel consumption, which is the rate of fuel consumption per unit of power output. In a regenerator, both the hot combustion products and the cool compressed air flow through the same heat exchange passages, but at different times for any one passage. The heat absorbed within any heat exchange passage from the hot combustion products during one time period is transferred during another time period to the cool compressed air. Unlike recuperative arrangements in which the two gas streams are confined to discrete flow passages, it is essential in regenerators that there be at least some moving elements in order to provide the alternating flow. Various regenerative approaches proposed in the past have included rotary regenerators in which the heat exchange matrix is rotated about an axis so as to move relative to stationary ducting which conducts hot and cold gases to and from the heat exchange matrix.

While a regenerative cycle is in theory an extremely effective means for providing low specific fuel consumption, it is essential in practice that leakage of high pressure air be held to a minimum in order to approach the low specific fuel consumption that is theoretically possible. When such leakage is allowed to occur, there is a loss to the system of the energy consumed in compressing the leakage air. It will thus be obvious that a significant amount of leakage can substantially reduce or even eliminate the increased thermal efficiency which otherwise would be obtained by use of the rotary regenerator. In addition, significant leakage can reduce substantially the total power output of the gas turbine powerplant. Accordingly, it is extremely desirable that a rotary regenerator be constructed such that this leakage is minimized.

Two major types of leakage must be overcome in order to prevent or at least substantially reduce leakage in rotary regenerators, the two types being commonly referred to as "seal leakage" and "carryover loss." With reference first to seal leakage, it will be appreciated that there is a tendency for leakage to occur between the relatively rotating elements since the compressor discharge air is at a much higher pressure than the exhaust gases. Accordingly, the high pressure compressed air tends to leak either into the hot gas stream or to atmosphere. When this happens, there is a loss to the system of the energy consumed in compressing the leakage air. It is, of course, apparent to those skilled in the art that sealing means are called for in order to reduce this leakage, and it is common practice to provide such seals. Nevertheless, the regenerative performance attained through the use of prior art seal arrangements has not been altogether satisfactory, the residual leakage through the seals being substantial. It is therefore highly desirable that more effective means be provided for reducing this seal leakage.

With respect to carryover losses, the heat exchange passages within the heat exchange area of a rotary regenerator are alternately filled with compressed air and exhaust gases as the passages move into and out of communication with the various stationary ducts. But, at the moment that a flow passage of a typical rotary regenerator moves out of communication with the compressed air ducting into communication with the exhaust gas ducting, a quantity of high pressure compressed air is trapped within the passage and is carried into the exhaust gas sector of the rotary regenerator. When this happens, the compressed air is dumped into the exhaust gas stream and is thereby lost to the system. The energy consumed in compressing the air is, of course, also lost. Since the air is at high pressure and each passage is repeatedly dumping compressed air into the exhaust stream this carry-over loss can be very substantial. To attain satisfactory efficiency, it is desirable that this carry-over loss be minimized.

It is therefore an object of this invention to provide for gas turbine powerplants an improved and highly efficient rotary regenerator.

Another object of this invention is to provide for gas turbine powerplants a rotary regenerator characterized by extremely low leakage during operation.

A further object is to provide improved sealing means for reducing seal leakage in a rotary regenerator.

A still further object is to provide an improved rotary regenerator having low carry-over losses.

Briefly stated, in carrying out the invention in one form, a rotary regenerator, which includes a rotor mounted annular heat exchange array and headers at opposite ends of the rotor for delivering high pressure fluid to and from an arcuate portion of the array, has axial sealing means at each end of the rotor for confining flow between the headers to the heat exchange passages of the arcuate portion. The sealing means at each end of the rotor includes a pair of stationary seal plates at circumferentially opposite ends of the associated header, the circumferential extent of each seal plate being greater than the circumferential extent of each passage of the heat exchange matrix. Each sealing means also includes a plurality of circumferentially spaced, radial sealing elements carried on the end of the rotor and positioned to slidably engage the seal plates as the heat exchange matrix moves relative to the headers. In accordance with one aspect of the invention, fluid conduit means interconnect a pair of seal plates to transmit high pressure fluid from the passages leaving the arcuate portion to passages entering the arcuate portion of the matrix.

By a further aspect of the invention, each seal plate has a plurality of radial grooves therein, seal wipers being positioned in the grooves and being biased toward the associated end of the rotor by suitable means. By a still further aspect of the invention, the groove and wiper configuration is such that the high pressure fluid is utilized for increasing the seal effectiveness by additionally biasing the wipers into sealing engagement with both the seal elements and the seal plates.

While the invention is distinctly claimed and is particularly pointed out in the claims appended hereto, the invention, both as to organization and content, will be better understood and appreciated, along with other objects and features thereof, from the following detailed description when taken in conjunction with the drawings, in which:

FIG. 1 is a partial view of a gas turbine powerplant including in cross section a rotary regenerator incorporating this invention;

FIG. 2 is a view of the upper half of the rotary regenerator as viewed in FIG. 1;

FIG. 3 is a view of the lower half of the rotary regenerator as viewed in FIG. 1;

FIG. 4 is a view taken along viewing line 4—4 of FIG. 2;

FIG. 5 is a view taken along viewing line 5—5 of FIG. 2 illustrating a pair of seal plates;

FIG. 6 is an enlarged view taken along viewing line 6—6 of FIG. 5 illustrating the seal wipers;

FIG. 7 is an enlarged view of seal wiper and groove configuration;

FIG. 8 is a view taken along viewing line 8—8 of FIG. 2 illustrating a rotor end and the sealing elements thereon;

FIG. 9 is an enlarged view taken along viewing line 9—9 of FIG. 8 illustrating a seal element;

FIGS. 11, 12, and 13 are schematic illustrations by which the operation of the regenerator can be more readily understood.

Figure 10:
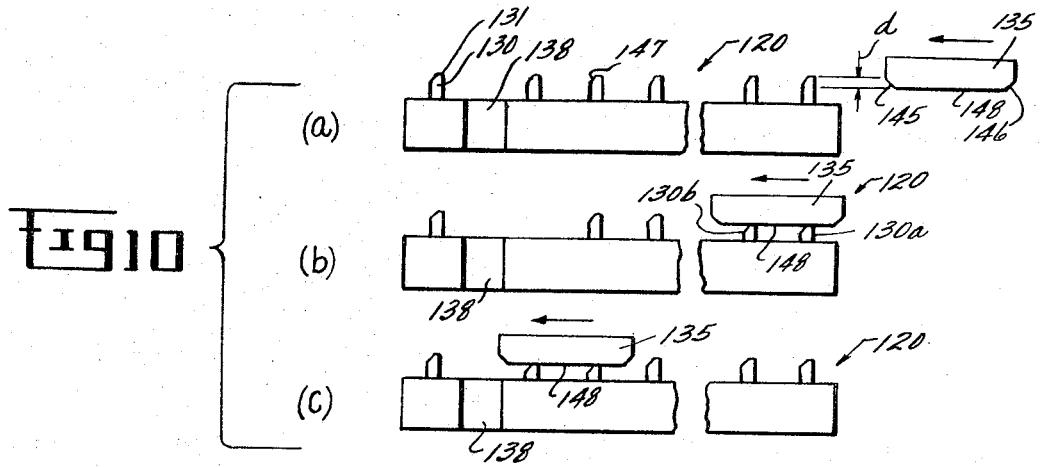
FIG. 10 is a view showing a sealing element in its operative relationships to a seal plate and its associated components.

With reference to FIG. 1, a gas turbine powerplant 10 having a rotary regenerator 11 constructed in accordance with this invention is illustrated. In addition to the rotary regenerator 11, the particular powerplant illustrated includes a gas generator 12 comprising a multiple stage axial flow compressor 13, a combustor 14, and a gas generator turbine 15 arranged in axially spaced relationship, the rotor of the turbine 15 driving the rotor of the compressor 13 through a hollow axial shaft 16. A power turbine 17 is located axially downstream of the gas generator turbine 15 and drives a load through a shaft 18 coaxially mounted for rotation within the shaft 16. The shaft 18 may, for example, drive a propeller to produce thrust for aircraft propulsion, in which case the gas turbine powerplant is commonly referred to as being a "turboprop" engine. As this description proceeds, it will become obvious that the gas turbine structure just described is illustrative only and that the invention is equally applicable to other arrangements, including "turboshaft" engines in which the power turbine 17 is used to drive loads other than propellers.

The present invention is, of course, concerned with a novel arrangement for reducing seal leakage and carry-over losses in a rotary regenerator. As such, the invention can be used in rotary regenerators of various designs; however, the invention is particularly suited for use in a rotary regenerator constructed in accordance with a structural arrangement described and claimed by a copending patent application entitled "Rotary Regenerator for Gas Turbine Powerplant," Ser. No. 517,415, filed on Dec. 29, 1965, in the name of Martin C. Hemsworth and assigned to the assignee of this invention. Accordingly, the sealing arrangement of this invention is illustrated in the rotary regenerator 11 which is constructed in accordance with the teaching of the Hemsworth application. To appreciate fully applicant's invention, the basic regenerative structure will be described first. Applicant's sealing arrangement will then be described in that context.

Before turning attention to the detailed construction and operation of the rotary regenerator 11, it will be well to outline briefly, with reference to FIG. 1, the principal components of the regenerator and its general mode of operation. Accordingly, the basic regenerative structure comprises three principal components; a stationary supporting structure; a rotor assembly; and means for supplying cool compressor discharge air and hot exhaust products to and from the rotor assembly. More particularly, the stationary supporting structure A includes a support member 20 upon which a rigid rotor B is mounted for rotation, the rigid rotor B carrying an annular heat exchange array 70. The heat exchange array 70 is comprised of a plurality of circumferentially spaced heat exchange units 71 and 72 each forming an axial passageway between the upstream and downstream ends of the rotor B. The stationary structure A supports headers 85 and 95 at the upstream and downstream ends, respectively, of the rotor B, the headers communicating with the heat exchange units forming a first arcuate portion of the heat exchange array 70 is connected to the discharge portion of the power turbine 17 by an exhaust duct 87 and to atmosphere by an exhaust duct 97. Further, manifold means comprising in part ducts 37 and in part the hollow support members of the stationary structure A and the rotor B supply compressor discharge air to the header 95, and similar manifold means including ducts 91 return compressor discharge air from the header 85 to the combustor 14. Finally, suitable means 80–82 are provided for rotating the rotor B such that the heat exchange units forming the first and second arcuate portions of the heat exchange array 70 are continually changed. The general mode of operation will now be clear. Hot exhaust products flow through the passageways of the heat exchange units of the second arcuate portion of the array 70 to transfer heat thereto, the heat then being transferred to the compressed air as the normal rotation of the rotor B carries the units from the second to the first arcuate portion of the heat exchange array 70.

Turning attention now to FIGS. 1–3, and the more detailed construction, the rotary regenerator 11 includes a generally cylindrical support member 20 located coaxially downstream of the power turbine 17, the downstream end of the support member 20 being closed by a cover plate 21. The upstream and downstream ends of the support member 20 form annular channels 23 and 25 opening in the downstream and upstream directions, respectively. As will be noted from the figures, these channels are closed by elements not yet described; accordingly, it will be appropriate to refer to these channels as annular plenums 23 and 25. The cylindrical support member 20 is actually the inner portion of an annular stationary support frame which includes a plurality of hollow struts 26 secured to and extending outwardly from the upstream end of the support member 20, the struts 26 having openings 27 therein communicating with the plenum 23. The circumferentially spaced struts 26 are secured at their outer ends to a hollow annulus 28, openings 29 providing communication between the struts 26 and the annulus 28. A similar plurality of hollow struts 32 are secured to and extend outwardly from the downstream end of the support member 20 to an annulus 33, the struts 32 having openings 34 and 35 therein communicating with the plenum 25 and the annulus 33, respectively. The upstream and downstream annuli 28 and 33, respectively, are interconnected by a plurality of circumferentially spaced, axial ducts 36 which provide fluid flow communication between the annuli 28 and 33. Another plurality of circumferentially spaced ducts 37 interconnect and provide communication between the upstream annulus 28 and the discharge portion of the compressor 13. More particularly, as shown by FIG. 1, an extraction annulus 40 surrounds the gas generator 12 outwardly of the combustor 14. The extraction annulus 40, a relatively rigid support member, is divided by a circumferential partition 41 into two annular sections 42 and 43. The upstream annular section 42 is connected to the high pressure end of the compressor 13 by a circumferential diffusing duct 44, and the downstream annular section 43 is connected to the combustor 14 by a duct 45. The axial ducts 37 interconnect the upstream annular section 42 of the extraction annulus 40 and the upstream annulus 28, in this manner providing fluid flow communication between the compressor 13 and the annulus 28. The elements discussed thus far, the cylindrical support member 20, the struts 26 and 32, the annuli 28 and 33, the ducts 36 and 37, and the extraction annulus 40, are all substantially rigid members rigidly interconnected to form a rigid, annular support frame for the rotary regenerator 11. In addition, the elements are in fluid communication such that compressor discharge air can flow through all of the elements in a manner which will be described at a later point in this specification.

With attention now being directed to FIGS. 2, 3, and 8, the rotatable portion of the rotary regenerator 11 will be described. The cylindrical support member 20 has frusto-conical bearing supports 50 and 51 thereon adjacent its upstream and downstream ends, respectively, carrying bearings 52 and 53 upon which a cylindrical shell 54 is mounted for rotation about the cylindrical support member 20. Immediately upstream of the bearing 52, a plurality of hollow struts 55 extend radially outward from the cylindrical shell 54 and are joined at their outer ends to an annulus 56, the circumferentially spaced struts 55 providing fluid communication between the annular plenum 23 and the annulus 56. Immediately downstream of the bearing 53, another plurality of hollow struts 58 extend radially outward from the shell 54 and are joined at their outer ends to an annulus 59, the struts 58 providing fluid flow communication between the plenum 25 and the annulus 59. To complete the support structure of the rotor assembly, the annuli 56 and 59 are interconnected by a plurality of circumferentially spaced, axial ducts 61 which provide fluid flow communication between the annuli. As in the case of the support elements comprising the stationary support frame, the support elements comprising the rotor assembly are substantially rigid members interconnected to form a rigid rotor assembly. Furthermore, these rotor support elements are in fluid communication with each other and with the support frame elements.

With attention still directed to FIGS. 2, 3, and 8, an annular heat exchange array 70 is carried by the rotor assembly, the array 70 comprising inner and outer rows of axially extending, circumferentially spaced heat exchange units surrounding the cylindrical shell 54. The heat exchange units comprise ducts 71 and 72 arranged in radially spaced pairs, one pair being located between each pair of adjacent radial struts 55 and 58. Further, as illustrated by FIG. 8, support members 77 interconnect the upstream ends of the ducts 71 and 72 to the cylindrical shell 54, the struts 55, and the annulus 56. Similar support members 78 interconnect the downstream ends of the ducts 71 and 72 to the shell 54, the struts 58 and the annulus 59. In this manner, fluid flow between the upstream and downstream ends of the rotor assembly can occur only through the axial passages formed by the ducts 71 and 72; the support members prevent axial leakage between the ducts 71 and 72 in addition to supporting the ends of the ducts. To provide the heat exchange function, heat exchange matrices 75 and 76 are located within the axial passages of the ducts 71 and 72, respectively.

It will be seen in FIGS. 2, 3, and 8 that a ring gear 80 is carried by the upstream annulus 56, a pinion 81 meshing therewith. By suitable means, such as an electric motor 82, the pinion 81 drives the ring gear 80 and hence the entire rotor assembly at a desired speed of rotation. It will, of course, occur to those skilled in the art that other drive arrangements could be used. For example, the rotor assembly could be geared to the gas generator turbine 15 or power turbine 17 and be driven therefrom instead of being driven by the electric motor 82. In any event, it should be noted that the speed of the rotor assembly of the rotary generator 11 is quite low, generally less than 100 r.p.m., as compared with the speeds of the turbines 15 and 17 which may rotate at speeds up to 18,000 r.p.m. and even higher.

Turning now to FIGS. 2, 3 and 4, it will be seen that an arcuate header 85 is supported by a portion of the upstream frame struts 26, the struts extending through the header 85 but not communicating therewith. As best shown by FIG. 2, the header 85 opens in the downstream direction so as to communicate with the upstream ends of the passages of the ducts 71 and 72 comprising the arcuate portion of the rotor assembly in alignment with the header 85. Since the rotor assembly is rotating during operation, the particular passages and the heat exchange units comprising this first arcuate portion of the heat exchange array 70 are continually changing. At any particular time, the heat exchange units not comprising the first arcuate portion comprise a second arcuate portion directly communicating with the discharge portion of the power turbine 17 through an exhaust duct 87. With reference now to FIGS. 1–3, an annulus 90 surrounds the exhaust duct 87, the annulus 90 communicating with the header 85 and the downstream annular section 43 of the extraction annulus 40 and the combustor 14 by means of circumferentially spaced, axial ducts 91.

Referring now to FIGS. 1 and 2, an arcuate header 95 is supported by a portion of the downstream frame struts 32, the struts extending through the header 95 and communicating therewith through openings 96 in the struts. The header 95 opens in the upstream direction so as to communicate with the downstream ends of the passages of the ducts 71 and 72 comprising the first arcuate portion of the rotor assembly as described previously. At any particular time, the ducts 71 and 72 comprising the second arcuate portion directly communicate with atmosphere through an exhaust duct 97.

With the basic arrangement of the gas turbine powerplant 10 now understood, its basic mode of operation will be described, after which the novel means of this invention for reducing leakage will be described in detail. The relatively cool compressed air from the compressor 13 is supplied through the extraction annulus 40 and the ducts 37 to the upstream annulus 28 where the flow divides, a first portion flowing through the axial ducts 36 to the downstream annulus 33 and a second portion flowing radially inward through the struts 26 to the plenum 23. The compressed air entering the plenum 23 is again divided, a first portion leaking through the bearing 52, then flowing along the inner surface of the rotor shell 54 through a passage defined by the shell 54 and guide means 105 on the support member 20, and finally leaking through the bearing 53 to the plenum 25. The second portion of the air entering the plenum 23 flows outwardly through the struts 55 to the annulus 56, then through the axial ducts 61 to the annulus 59, and finally inwardly through the struts 58 to the plenum 25. From the annulus 33 and the plenum 25, the compressed air enters the downstream header 95 through the struts 32 and the openings 96 therein. It will, of course, occur to those skilled in the art that the flow passages of the various elements comprising the support frame and the rotor assembly should be sized such that each has the proper quantity of air flowing therethrough. From the foregoing, it will be seen that the structural elements comprising both the support frame and the rotor assembly form manifold means for supplying compressed air to the header 95, the elements being maintained at low temperature during operation because of the relatively cool compressed air flowing therethrough. Consequently, both the support frame and the rotor assembly display a high degree of dimensional stability during operation. This dimensional stability makes effective sealing much more easily accomplished. In the event that for some reason the rotor were to stop rotating during operation, the compressed air flowing through the various support elements would prevent overheating of the elements stalled in the hot gas path.

The compressed air from the downstream header 95 flows through the flow passages of the first arcuate portion of the heat exchange array 70 to the upstream header 85. The heated air is then supplied to the combustor 14 through the ducts 91 and the extraction annulus 40. While the compressed air is flowing through the passages of the heat exchange units comprising the first arcuate portion of the heat exchange array 70, hot exhaust products from the exhaust duct 87 are flowing through the heat exchange units comprising the second arcuate portion of the array to heat the matrices 75 and 76, the cooled exhaust products being discharged to atmosphere through the exhaust duct 97. Since the rotor assembly is rotating, the flow passages comprising the first and second arcuate portions of the heat exchange array 70 are continually changed. In this manner, heat is continually transferred from the high temperature combustion products to the compressed air entering the combustor 14.

From the foregoing it will be obvious to those skilled in the art that leakage of high pressure air as it flows between the downstream header 95 and the upstream header 85 will adversely affect the powerplant efficiency. Furthermore, it will be obvious that leakage includes all air which leaves the header 95 and fails to arrive at the header 85. This leakage can occur in two ways. Firstly, leakage can occur in the radial planes between the headers 85 and 95 and the upstream and downstream ends, respectively, of the rotor assembly. Secondly, air can be trapped within the ducts 71 and 72 as the ducts move from the first arcuate portion to the second arcuate portion of the heat exchange array 70, such air then being discharged to atmosphere through the exhaust duct 97. The improved sealing means of this invention not only reduces seal leakage, but also reduces the amount of air trapped or carried over from the high pressure or first arcuate portion to the low pressure portion of the heat exchange array 70.

The axial sealing means between the upstream header 85 and the upstream end of the rotor will now be described. With reference to FIGS. 2, 5, and 8, the upstream end of the rotor assembly has inner and outer annular seal members 110 and 111, respectively, mounted thereon at the inner and outer peripheries of the heat exchange array 70. More particularly, these seal members 110 and 111 are mounted on the upstream ends of the rotor shell 54 and the annulus 56 respectively, and have smoothly finished, radially disposed sealing surfaces 112 and 113 facing upstream. From the standpoint of wear resistance as well as sealing efficiency, these seal members 110 and 111 may be made of Stellite 6B coated with X–15 Molykote high temperature lubricant. However, it will be obvious to those skilled in the art that, within the practice of the invention, the seal members 110 and 111 may be made of many suitable materials. Similar inner and outer annular seal members 114 and 115, respectively, are carried by the upstream header 85 and the exhaust duct 87 in radial alignment with the seal members 110 and 111. As best shown by FIGS. 2 and 5, the stationary seal members 114 and 115 are each comprised of a plurality of seal segments 114a and 115a having downstream facing sealing surfaces 116 and 117, respectively. The seal segments 114a and 115a are biased in the axially downstream direction by spring elements 118 and 119, respectively. In this manner, the sealing faces 112 and 116 abut axially to prevent radial leakage of high pressure fluid through the axial spacing between the upstream end of the rotor and the stationary structure, which includes the header 85, the exhaust duct 87, and the upstream plenum 23. Similarly, the sealing faces 113 and 117 abut axially to prevent radially outward leakage. The high degree of dimensional stability provided by the invention of the copending Hemsworth application contributes significantly to the sealing efficiency of this arrangement by maintaining the axial spacing between the rotor and the stationary structure both small and uniform.

In addition to sealing against radial leakage in the manner just described, it is necessary to prevent circumferential leakage from the header 85 and the first or high pressure portion of the heat exchange array 70 to the exhaust duct 87 and the second or low pressure portion of the array through the axial space between the stationary structure and the upstream end of the rotor. In accordance with the present invention, a pair of stationary seal plates 120 and 121 are mounted at circumferentially opposite ends of the header 85 as shown by FIG. 5. These seal plates extend radially the entire distance between the annular seal members 114 and 115 and have radially disposed faces 122 and 123. For reasons which will become apparent as this description proceeds, the circumferential extent of the seal plates 120 and 121 is greater than the circumferential extent of the heat exchange units and the ducts 71 and 72.

With reference now to FIGS. 2 and 5–7, the seal plate 120 is shown in greater detail. As illustrated, the seal plate has a plurality of circumferentially spaced, radial grooves 124 in the face 122 thereof, the grooves 124 being undercut and substantially T-shaped in cross section. Each groove 124 has a first side closer to or adjacent the header 85 and a second side remote from the header, the first side having passages 125 therein communicating with the interior of the groove 124 from the face 122 and the second side having a radially disposed axial seal surface 126. Received in each groove 124 is a respective seal wiper 130 which also has a T-shaped cross section, the leg 131 of the T projecting axially from the face 122 of the seal plate toward the upstream end of the rotor and being biased in that direction by a wave spring 132 positioned between the seal wiper 130 and the bottom of the groove 124. Actually, the maximum amount that the leg 131 can project from the fan 122 is greater than the normal axial spacing between the seal plate 120 and upstream end of the rotor during regenerator operation.

Turning attention now to FIGS. 2, 8 and 9, a plurality of radially disposed, circumferentially spaced seal elements 135 are carried on the upstream end of the rotor. More particularly, the seal elements 135 extend radially between the inner and outer annular seal members 110 and 111 and are located in front of the radial struts 55 of the rotor. In other words, the seal elements 135 are located between adjacent pairs of heat exchange ducts 71 and 72. In the practice of the present invention, sealing is provided by sliding engagement between the seal wipers 130 and the seal elements 135. Tests have indicated that satisfactory sealing and wear resistance is attained by making the seal wipers 130 and the seal members 135 of Stellite 6B coated with X–15 Molykote high temperature lubricant. Other materials can, of course, also be used without departing from the spirit of the invention.

Similar axial sealing means is also used to prevent leakage through the axial space between the downstream header 95 and the downstream end of the rotor. Accordingly, identical sealing means are identified in FIG. 2 by primed numerals.

Figure 11:
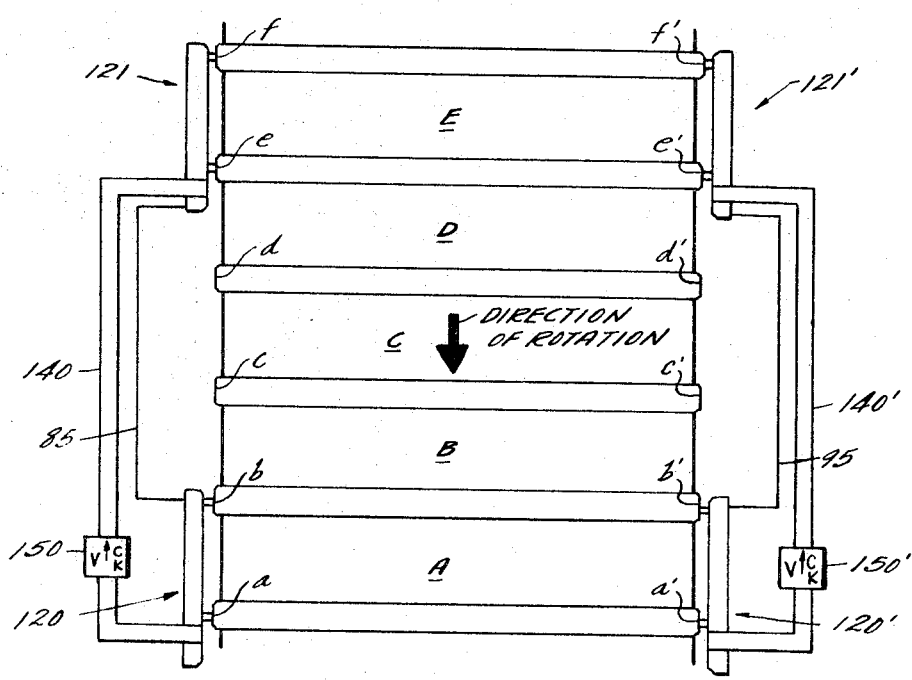

It will also be noted from FIGS. 5, 6 and 10 that the seal plate 120 has a port 138 in the radial face 122 thereof between the two seal wipers most remote from the header 85. A smiliar port 139 is provided in the radial face 123 of the seal plate 121, the port 139 being located between the two seal wipers adjacent the header 85. These ports 138 and 139 are interconnected by a conduit 140 as illustrated by FIGS. 11–13. As will be described more fully, this porting arrangement reduces carry-over losses substantially. If desired, similar porting means 138′–140′ may be provided between the seal plates 120′ and 121′ at the downstream end of the rotor.

With particular reference now to FIG. 10 as well as to FIGS. 5–9, the sealing action at the seal plate 120 will be described. As each seal element 135 approaches the seal plate 120, the legs 131 of the seal wipers 130 axially overlap the seal element 135 by a distance d as shown by FIG. 10(a). Accordingly, the seal element 135 has a ramp or cam surface 145 at its leading edge which causes the legs 131 of the seal wipers 130 to be depressed against their springs 132 and ride along the cam surface 145 onto a flat sealing surface 148 as illustrated by FIG. 10(b). The circumferential extent of this sealing surface 148 is sufficient to simultaneously engage the legs of any two adjacent wipers 130; in this manner, there is at all times engagement between the surface 148 and at least one seal leg 131. With the sealing surface 148 being contacted by two seal wipers 130a and 130b as illustrated by FIG. 10(b), primary sealing is provided by the wipers 130a since it is biased against the sealing surface 148 not only by spring pressure but also by an unbalanced force created by high pressure air admitted into the groove 124 through the passages 125; the spring pressure alone causes sealing between the wiper 130b and the sealing surface 148 at this instant. At a later moment, however, when the wiper 130a rides down the ramp 146, the high pressure is communicated to and increases the sealing force of the wiper 130b. In addition, the high pressure fluid forces the side of the leg remote from the high pressure header against the seal surface 126 to prevent escape of high pressure fluid. It is not desirable to allow the pressure forces to seat the wipers against surfaces 126 when the wiper is in contact with the cam surfaces 145 and 146; consequently, circumferential slots 150 and 151 may be provided in the cam surfaces 145 and 146 (see FIG. 8) to equalize pressure on both sides of each leg 131 while the leg is in contact with one of the surfaces.

Turning now to FIGS. 11–13, the operation of the means for reducing carry-over losses will be explained. The heat exchange matrix 70 of the regenerator rotates in the direction indicated such that the heat exchange ducts 71 and 72 moves past the seal plates 121, 121' and 120, 120' into and out of the high pressure or first arcuate portion of the matrix between the headers 85 and 95. To simplify the description, the pairs of ducts 71 and 72 are indicated by letters A, B, etc., and the seal elements by a, a', b, b', etc. At the moment the components are positioned as shown by FIG. 11, the seal elements, a, a', b, and b' are engaging the seal wipers of seal plates 120 and 120', and the seal elements e, e', f, and f' are engaging the seal wipers of the seal plates 121 and 121'. As a result, high pressure air from the header 95 is trapped in the ducts A and low pressure combustion gases are trapped in the ducts E. At a slightly later moment, as shown by FIG. 12, rotation of the matrix has carried the seal elements a and a' and the seal elements e and e' past the ports in the seal plates such that high pressure air from the ducts A can flow through the conduits 140 and 140' to the ducts E to equalize the pressure in the ducts A and E. This means that a substantial quantity of the air originally in the ducts A is not dumped as the seal elements a and a' move beyond the seal plates 120 and 120' to the position illustrated by FIG. 13. At the same time, the ducts E are prepressurized and a certain amount of air is heated therein before the seal between the seal elements e and e' and the seal plates 121 and 121' is broken. With the matrix and the sealing components positioned as shown in FIG. 13, the high pressure air cannot flow through the conduits 140 and 140' from the ducts E to the ducts A and thus to atmosphere since one-way check valves 150 and 150' prevent flow in that direction. As a result, the means just described reduces the amount of high pressure air carried from the first to the second arcuate portion of the regenerator, but prevents dumping of high pressure air through the porting arrangement.

It will be understood that the invention is not limited to the specific details of construction and arrangement of the embodiment illustrated and described herein since changes and modifications will be obvious to those skilled in the art. It is therefore intended to cover in the appended claims all such changes and modifications which may occur to those skilled in the art without departing from the true spirit and scope of the invention.

What is claimed as new and is desired to secure by Letters Patent of the United States is:

1. In a rotary regenerator including an annular heat exchange array mounted for rotation about an axis, the array having a plurality of circumferentially spaced passages extending axially between upstream and downstream ends of the array; upstream and downstream stationary headers adjacent the upstream and downstream ends, respectively, of the array communicating with an arcuate portion of the array; and means for rotating the array to continually change the passages comprising the arcuate portion of the array; sealing means for confining fluid flow between said headers to the passages comprising the arcuate portion of the array, said sealing means comprising:

first axial sealing means between said upstream header and the upstream end of said array and second axial sealing means between said downstream header and the downstream end of said array;
each of said sealing means including:
a pair of stationary seal plates located at the circumferentially opposite ends of the respective header, the circumferential extent of each of said seal plates being greater than the circumferential extent of any of the passages in said array, and a plurality of radial seal elements carried on the associated end of said array, said seal elements being located circumferentially between adjacent passages and being axially positioned to slidably engage the associated seal plates;
and fluid conduit means interconnecting the pair of seal plates of at least one of said sealing means to transmit fluid between passages leaving the arcuate portion and entering the arcuate portion of said array.

2. Sealing means as defined by claim 1 in which each of said seal plates includes a plurality of radially disposed, circumferentially spaced seal wipers projecting axially from the radial face of the seal plate and means biasing each of said seal wipers toward the associated end of said array to slidably engage said seal elements.

3. Sealing means as defined by claim 2 in which said fluid conduit means includes a port in the radial face of each of said pair of seal plates, said ports being located intermediate adjacent pairs of seal wipers.

4. In a gas turbine powerplant having a compressor, a combustor, and a turbine for driving said compressor, a rotary regenerator comprising:

a rotor mounted for rotation about an axias, said rotor having axially spaced upstream and downstream ends;
an annular heat exchange array comprising a plurality of circumferentially spaced heat exchange units carried by said rotor, each of said heat exchange units extending axially between the upstream and downstream ends of said rotor and forming a fluid flow passage therebetween;
upstream and downstream stationary headers adjacent the upstream and downstream ends, respectively, of said rotor communicating with a first arcuate position only of said annular heat exchange array;
first manifold means interconnecting the discharge portion of said compressor and one of said headers;
second manifold means interconnecting the inlet portion of said combustor and the other of said headers;
a first exhaust duct interconnecting the discharge portion of said turbine and the upstream end of a second arcuate portion only of said annular heat exchange array;
a second exhaust duct for discharging gas to atmosphere from the downstream end of said second arcuate portion of said annular heat exchange array;
means for rotating said rotor and said annular heat exchange array to continually change the heat exchange units comprising said first and second arcuate portions of said heat exchange array;
and first axial sealing means between said upstream header and the upstream end of said rotor and second axial sealing means between said downstream header and the downstream end of said rotor, said first and second sealing means confining flow of high pressure fluid between said headers to the passages of the heat exchange units comprising said first arcuate portion of said heat exchange array;

each of said sealing means including:

a pair of stationary seal plates having radially disposed faces at the circumferentially opposite ends of the respective header, the circumferential extent of each of said seal plates being greater than the circumferential extent of any of said heat exchange units, a plurality of radially disposed, circumferentially spaced seal wipers projecting axially from the radial face of each of said seal plates, means biasing each of said seal wipers axially toward the associated end of said rotor, and a plurality of radially positioned seal elements carried on the associated end of said rotor, said seal elements being located in the circumferential spaces between adjacent heat exchange units and being axially positioned to slidably engage the associated seal wipers to prevent circumferential leakage therebetween.

5. A rotary regenerator as defined by claim 4 in which said seal wipers and said seal elements have complementary cam surfaces thereon to facilitate sliding engagement therebetween.

6. A rotary regenerator as defined by claim 4 in which the ports in the radial faces of said sealing plates are located to communicate with the passages of heat exchange units entering said first arcuate portion before said units entirely leave said second arcuate portion of said heat exchange array, whereby said passages are purged of exhaust gases by high pressure fluid entering said passages.

7. A rotary regenerator as defined by claim 4 in which the pair of sealing plates of at least one of said sealing means each has a port in the radial face thereof intermediate an adjacent pair of wipers, fluid conduit means interconnecting said ports to transmit high pressure fluid from the passages of the heat exchange units leaving said first arcuate portion to the passages of heat exchange units entering said first arcuate portion of said heat exchange array, whereby the amount of high pressure fluid carried into said second arcuate portion and thereafter discharged to atmosphere through said second exhaust duct is minimized.

8. A rotary regenerator as defined by claim 4 in which each of said sealing means includes inner and outer annular seal members on the end of said rotor at the inner and outer peripheries, respectively, of said heat exchange array and similar inner and outer stationary annular seal members carried by the associated header and exhaust duct structure, respective ones of said rotating and stationary seal members engaging to reduce radial leakage of high pressure fluid.

9. A rotary regenerator as defined by claim 4 in which said seal plate and wipers assemblies each comprise:

a plurality of radial grooves in the radial face of said seal plates, each groove having a first side adjacent the associated header and a second side remote from the associated header, each of said seal wipers positioned in a respective one of said radial grooves and biased axially toward the associated end of said rotor, the second sides of said grooves having axially extending seal surfaces, the respective sides of said seal wipers having complementary seal surfaces, the first sides of said grooves having passages therein to admit high pressure fluid from the associated header into said grooves, whereby high pressure fluid in said grooves urges said seal wipers axially into sealing engagement with said seal elements and circumferentially into sealing engagement with the seal surfaces of said grooves.

10. A rotary regenerator as defined by claim 7 in which said grooves are undercut, said grooves and said seal wipers being T-shaped in cross section.

11. A rotary regenerator as defined by claim 8 in which said seal wipers are biased axially toward the associated end of said rotor by wave springs.

References Cited

UNITED STATES PATENTS

| 2,055,071 | 9/1936 | Eriksson | 165—9 |
| 2,757,907 | 8/1956 | Williams | 165—9 |
| 3,180,562 | 4/1965 | Bentele | 230—145 |
| 3,194,302 | 7/1965 | Kronogard | 165—9 |

CARLTON R. CROYLE, *Primary Examiner.*